United States Patent
Mildner et al.

(10) Patent No.: US 9,758,998 B2
(45) Date of Patent: Sep. 12, 2017

(54) MOTOR VEHICLE DOOR WITH HINGE REINFORCEMENT

(71) Applicant: GM GLOBAL TECHNOLOGY OPERATIONS LLC, Detroit, MI (US)

(72) Inventors: Udo Mildner, Limburg (DE); Lothar Teske, Aschaffenburg (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/927,008

(22) Filed: Oct. 29, 2015

(65) Prior Publication Data

US 2016/0123057 A1    May 5, 2016

(30) Foreign Application Priority Data

Oct. 29, 2014  (DE) .................... 20 2014 008 599 U

(51) Int. Cl.
| | | |
|---|---|---|
| *B60J 5/04* | (2006.01) | |
| *E05D 11/00* | (2006.01) | |
| *E05D 5/02* | (2006.01) | |

(52) U.S. Cl.
CPC ............ *E05D 11/00* (2013.01); *B60J 5/047* (2013.01); *B60J 5/0431* (2013.01); *E05D 5/0207* (2013.01); *E05D 2011/009* (2013.01)

(58) Field of Classification Search
CPC ....... B60J 5/0431; B60J 5/047; E05D 5/0207; E05D 2011/009; F16B 5/065
See application file for complete search history.

(56) References Cited

U.S. PATENT DOCUMENTS

| | | | | |
|---|---|---|---|---|
| 1,694,825 A | * | 12/1928 | Ledwinka | ............. B60J 5/0431 16/270 |
| 2,775,919 A | * | 1/1957 | Fischer | .................... B60R 1/06 248/220.21 |
| 4,831,710 A | * | 5/1989 | Katoh | .................... B60J 5/0406 29/430 |

(Continued)

FOREIGN PATENT DOCUMENTS

| | | |
|---|---|---|
| CN | 2849073 Y | 12/2006 |
| CN | 204645919 U | 9/2015 |

(Continued)

OTHER PUBLICATIONS

German Patent Office, German Search Report for German Application No. 202014008599.4, dated Jun. 12, 2015.

(Continued)

*Primary Examiner* — Glenn Dayoan
*Assistant Examiner* — Paul Chenevert
(74) *Attorney, Agent, or Firm* — Lorenz & Kopf LLP

(57) ABSTRACT

A motor vehicle door is configured to hingedly mount to the body of a motor vehicle. The door includes a door structure having a hinge reinforcement arranged on an interior side of the door structure. The hinge reinforcement includes a respective mounting flange section abutting the door structure on at least two opposing outer edges and a force absorption area between the at least two opposing mounting flange sections. The force absorption area is situated at a distance from the door structure to define a hollow space there between. The force absorption area is supported against the door structure by at least one bushing.

15 Claims, 4 Drawing Sheets

(56) References Cited

U.S. PATENT DOCUMENTS

| | | | | |
|---|---|---|---|---|
| 5,624,150 | A * | 4/1997 | Venier | B62D 21/09 |
| | | | | 16/384 |
| 5,676,510 | A * | 10/1997 | Fischer | B60J 5/0431 |
| | | | | 411/104 |
| 6,038,740 | A * | 3/2000 | Hoger | E05D 7/04 |
| | | | | 16/235 |
| 6,343,832 | B1 * | 2/2002 | Queener | B60J 5/0425 |
| | | | | 296/146.6 |
| 7,654,607 | B2 | 2/2010 | Stojkovic et al. | |
| 7,976,237 | B2 * | 7/2011 | Vollet | B21D 22/04 |
| | | | | 403/408.1 |
| 8,007,025 | B2 * | 8/2011 | Kohr | E05D 5/043 |
| | | | | 296/146.11 |
| 8,042,860 | B2 * | 10/2011 | Takahashi | B60J 5/0426 |
| | | | | 296/146.6 |
| 9,623,730 | B2 * | 4/2017 | Mori | B60J 5/0468 |
| 2009/0152896 | A1 * | 6/2009 | Enderich | B62D 25/00 |
| | | | | 296/187.03 |
| 2013/0251475 | A1 | 9/2013 | Schraer | |
| 2015/0246598 | A1 * | 9/2015 | Kajigai | B60J 5/0468 |
| | | | | 49/388 |

FOREIGN PATENT DOCUMENTS

| | | | | | |
|---|---|---|---|---|---|
| DE | 10245255 | B3 * | 1/2004 | | B29C 33/44 |
| DE | 10344707 | | * | 4/2005 | B60J 5/04 |
| DE | 10356808 | A1 * | 7/2005 | | B62D 65/06 |
| DE | 202004016085 | U1 | 2/2006 | | |
| DE | 102005023644 | A1 | 11/2006 | | |
| DE | 202008001900 | U1 | 4/2008 | | |
| DE | 102006058109 | | * | 6/2008 | B60J 5/0404 |
| DE | 102007011719 | | * | 9/2008 | B62D 25/04 |
| DE | 102009019903 | | * | 11/2010 | B60R 1/06 |
| DE | 102012019295 | | * | 3/2013 | E05D 5/0207 |
| GB | 161461 | A * | 4/1921 | | B60J 5/0412 |
| GB | 628863 | A * | 9/1949 | | B60J 5/0431 |
| JP | 2002225563 | A | 8/2002 | | |
| JP | 2007284015 | A * | 11/2007 | | B62D 25/08 |
| KR | 20080053430 | A | 6/2008 | | |

OTHER PUBLICATIONS

Great Britain Patent Office, Great Britain Search Report for Great Britain Application No. 1516885.9, dated Feb. 4, 2016.

* cited by examiner

A-A

MOTOR VEHICLE DOOR WITH HINGE REINFORCEMENT

CROSS-REFERENCE TO RELATED APPLICATION

This application claims priority to German Patent Application No. 202014008599.4, filed Oct. 29, 2014, which is incorporated herein by reference in its entirety.

TECHNICAL FIELD

The present disclosure pertains to a motor vehicle door configured to be hingedly mounted to the body of a motor vehicle, and more particularly to a door structure and a hinge reinforcement arranged on an interior side of the door structure. In another aspect, the present disclosure further relates to a motor vehicle equipped with such a motor vehicle door.

BACKGROUND

Motor vehicles, in particular passenger cars typically have several side doors each hingedly mounted on an A- or B-pillar. Therefore, the hingedly mounted side doors of motor vehicles are typically coupled to load-bearing, and thus sufficiently stable and torsion-free components of the motor vehicle body. However, if possible, the motor vehicle door itself is made out of comparatively thin-walled sheet metal components in order to minimize the weight of the body and motor vehicle. In this regard, a reinforcement must be provided on the door side for corresponding door hinges in order to hingedly mount such vehicle doors.

DE 10 2005 023 644 A1 discloses a threaded connection between a hinge of a vehicle door and a door frame of a motor vehicle body. This threaded connection is provided with a safeguard, which retains a threaded fastener on the body-side door frame with the hinge removed from the door frame. The loss prevention safeguard is here provided on an additional component fastened to the door frame.

SUMMARY

The present disclosure provides a motor vehicle door with a hinge reinforcement that is characterized by a high level of stability and a comparably low weight. The hinge reinforcement is here intended to allow the introduction of the most uniform, point load-preventing forces possible into a door structure, and thereby contribute to providing the most long-lived, durable and low-maintenance door-side hinge attachment possible. In addition, it is provided that the overall number of components required to realize a hinge reinforcement be reduced, in particular so as to reduce the production and manufacturing complexity, along with the manufacturing costs associated therewith.

The motor vehicle door includes a door structure with a hinge reinforcement arranged on the interior side of the door structure. The hinge reinforcement here includes a respective mounting flange section that comes to abut against the door structure on at least two opposing outer edges or outer surfaces. Situated between the latter is a force absorption area of the hinge reinforcement, which ends up spaced apart from the door structure with the formation of a hollow space, and is situated at a distance from the door structure with the formation of a hollow space when the hinge reinforcement is arranged on or fastened to the door structure.

Creating a hollow space and structurally connecting the at least two opposing mounting flange sections makes it possible to introduce mechanical loads into the door structure over a comparatively large surface or area. Point loads and forces acting on the door structure can be largely eliminated in this way. This can help the door stay durable and maintenance-free. In addition, this basically makes it possible to reduce the sheet thicknesses of the door structure and/or hinge reinforcement itself. Due to the low material input, this enables not just a cost reduction, but in particular also a weight reduction of the motor vehicle door and motor vehicle.

In another embodiment, the force absorption area is supported against the door structure by means of at least one bushing. It is here provided in particular that the bushing form a thrust bearing for a fastening means of a hinge wing, and in this respect that a force be introduced into the hinge reinforcement by way of the bushing, and in this respect that a force be introduced into the door structure of the motor vehicle door by way of the spaced apart mounting flange sections.

Creating the hollow space relative to the door structure and introducing the force into the door structure by way of the bushing via the mounting flange sections spaced radially apart relative to the bushing makes it possible to provide an attachment of the door hinge to the door structure having a relatively high torque rigidity. Such a connection enables the transmission of comparably high loads between the door hinge or door hinge wing and the door structure, and hence the motor vehicle door.

In a further development, the bushing penetrates through the hollow space, and is also aligned flush with a passage opening formed in the door structure. In this way, the bushing can accommodate a fastening means guided through the passage opening of the door structure, for example a threaded fastener. The bushing, in particular its interior wall, can in particular interact with such a fastening means or fastening element, and act as a thrust bearing for the fastening element.

Because the bushing penetrates through the hollow space and is also structurally connected with the force absorption area of the hinge reinforcement spaced apart relative to the door structure, it can additionally reinforce the force absorption area, e.g., which can be given a largely flat design, and separately support it against the door structure. In this respect, it can be provided that the force absorption area be made to abut against the door structure in three ways, specifically with the at least two opposing mounting flange sections and the at least one bushing. In particular, this multiple abutment makes it possible to distribute the introduced and transmitted forces between the door structure and hinge reinforcement.

In a further development, the bushing is also joined as a single piece with the force absorption area. It can further be molded thereto. On the one hand, the integral configuration of the force absorption area with the bushing, and thus the integral configuration of the bushing with the hinge reinforcement, enables a particularly good and long-lasting bond between the force absorption area and bushing. On the other hand, the bushing joined as a single piece with the force absorption area can be manufactured at a relatively high production efficiency. The bushing can be molded onto the force absorption area in particular during a forming process, for example via deep drawing, as well as by hot or cold working a blank. It is alternatively conceivable that the bushing be permanently bonded with the force absorption area in a bonding process, e.g., through welding.

In a further development of the above, an end section of the bushing that faces the force absorption area includes a female thread section. The latter is used in particular to fabricate a threaded connection for a threaded fastener that penetrates through the passage opening of the door structure. By introducing the female thread section only in the end section of the bushing that faces the force absorption area and faces away from the free ends of the bushing in this respect, a force or torque is transmitted between the threaded fastener and bushing spaced apart relative to the door structure. This facilitates an introduction and transmission of forces between the hinge reinforcement and door structure via the edge-side mounting flange sections. In this respect, a comparatively expansive and uniform transmission of forces and torques can be provided between the door hinge and door structure. This further makes it possible to realize a kind of two-shear connection between the door hinge and door structure.

In a further development hereof, an end section of the bushing that faces the door structure includes a non-threaded section. As a result, a tightening and fastening torque can be transmitted by way of this non-threaded section with the threaded fastener inserted. In this respect, point loads, e.g., from supporting the bushing itself on the door structure, can be largely avoided or at the very least reduced.

In another embodiment, the non-threaded section makes up about 50% to 85% of the overall bushing length. In this regard, it is provided that the female thread section of the bushing that is situated facing the force absorption area and is situated facing away from the door structure measure at most 50% and at least 15% of the overall bushing length. The female thread section can here adjoin as far as the force absorption area having a largely flat design. The bushing typically extends roughly perpendicular to the force absorption area or perpendicular to the plane of the force absorption area. By molding the bushing to the force absorption area or configuring it as a single piece therewith, the force absorption area can exhibit a passage opening whose peripheral boundary is joined as a single piece with the bushing or transitions into the bushing.

In a further embodiment, the length of the bushing measures between 20 mm and mm. It can preferably measure between 25 mm and 30 mm. The length of the female thread section of the bushing can in this respect measure between 15 mm and 25 mm. Based on simulations and load calculations, such a dimension and longitudinal extension of the bushing as well as its female thread section and the non-threaded section proves to be especially advantageous for achieving the most uniform and extensive possible transmission of forces and torques between the door hinge and door structure via the at least two opposing mounting flange sections and the bushing that abuts against the door structure.

A smaller bushing length, which then also yields a correspondingly shorter distance and less hollow space between the force absorption area and door structure, intensifies the point load. By contrast, a significantly longer bushing configuration and concurrent geometric configuration of the mounting flange sections can lead to tilting instabilities of the hinge reinforcement, which would possibly require thicker walls for the hinge reinforcement.

In a further embodiment, the end section of the bushing that faces the door structure and thus faces away from the force absorption area includes a radially expanded collar or flange. A radially expanded collar or flange can be used to provide an abutment surface between the bushing and door structure that is expanded by comparison to the wall thickness of the bushing. Point loads can be largely minimized in this way.

In a further embodiment of the hinge reinforcement, the latter includes a circumferential flange structure that forms an outer edge. Given a configuration of the force absorption area roughly similar to a square or rectangle, for example, the hinge reinforcement can exhibit four of the mounting flange sections that follow the outer edges of the absorption area, of which a respective two are situated in pairs one opposite the other.

However, the circumferential flange structure can exhibit any geometry that has been adjusted to the specific construction of the door structure. In particular, the flange structure is designed correspondingly or congruently to the connecting area of the door structure provided for this purpose. The hinge reinforcement is typically permanently joined with the door structure via the flange structure. However, other mounting methods are here also basically conceivable, for example adhesive bonding or clinching.

In a further embodiment, the hinge reinforcement is designed like a trough or cup. The force absorption area here forms a trough or cup floor, which is framed by the circumferential flange structure. It can here be provided in particular that the force absorption area, which typically includes a flat structure and geometry, transitions on its edge side into a cheek section that runs roughly perpendicular to the plane of the force absorption area and at least regionally circumferentially encloses the force absorption area, and itself passes over into the outwardly projecting flange structure, facing away from the force absorption area.

For example, the hinge reinforcement can exhibit a hat profile-like contour in terms of its cross section. Giving the hinge reinforcement a trough or cup-shaped configuration allows it to have a self-contained geometry and surface contour, which can serve to stiffen the hinge reinforcement.

In a further embodiment, the hinge reinforcement includes at least two bushings in the force absorption area that are spaced apart from each other, aligned parallel to each other, and typically similar in design. At least two or more bushings can be used not just to support the hinge reinforcement on the door structure at multiple locations. If both bushings are provided with a female thread section, each bushing can serve as a thrust bearing for a fastening means, e.g., for a threaded fastener, so that a force and torque transmission can be introduced via each of the bushings spaced apart from each other in the force absorption area, and thus in the at least two opposing mounting flange sections, and consequently into the circumferential flange structure.

Giving the bushings a one-piece design and providing the bushings with a female thread section obviates the need for the otherwise customary attachment and use of weld nuts, for example. This eliminates the necessity for the otherwise customary weld nuts or rivet nuts, for example which are welded to a force-absorbing threaded plate. As a whole, the number of components for realizing a hinge reinforcement can thus be advantageously reduced.

In another embodiment, a door hinge wing of a door hinge is joined with the door structure via the door reinforcement by means of a threaded fastener that engages the bushing. A head of this threaded fastener here abuts against an exterior side of the motor vehicle door facing away from the door reinforcement. The threaded fastener can typically be passed through the passage opening provided on the door structure from a face side and from outside, and introduced into the bushing that is aligned relative to the passage opening on the door structure side, after which it can be fastened with the female thread section of the bushing.

On the one hand, the bushing itself can be tensioned against an interior of the door structure by tightening the threaded fastener. In addition, a certain tightening torque can be introduced into edge-side fastening flange sections over the force absorption area of the hinge reinforcement by tightening the threaded fastener, so that a repeated and spatially distributed introduction of forces into the door structure takes place as a whole.

In a further aspect, a motor vehicle body is also provided with at least one pillar, to which at least one motor vehicle door described above can be hingedly mounted by means of at least one door hinge. In addition, a motor vehicle in a further aspect is provided with a motor vehicle body that includes at least one motor vehicle door described above that can be hingedly mounted thereto by means of at least one door hinge.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
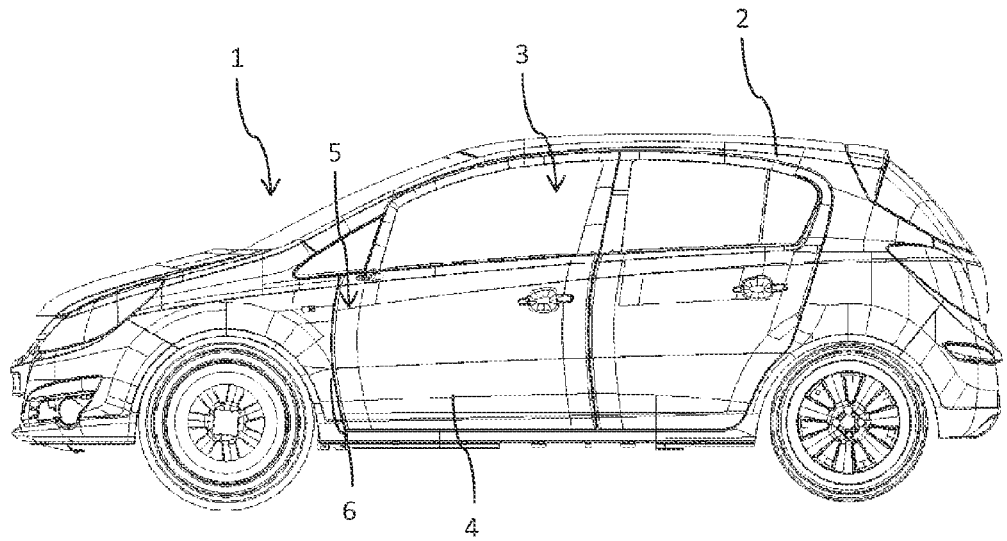
FIG. 1 is a schematic side view of a motor vehicle.

The motor vehicle 1 depicted on FIG. 1 in a side view includes a self-supporting motor vehicle body 2 with an interior 3 that serves as a passenger compartment. FIG. 1 also shows several motor vehicle doors 4, of which reference will in the following only be made to the left, front motor vehicle door 4. In the specific exemplary embodiment, the motor vehicle door 4 is hingedly mounted to the motor vehicle body 2 by way of two door hinges 5 on an A-pillar 6 that are spaced apart from each other in the vertical direction of the vehicle (z) and only denoted on FIGS. 1 and 2.

Figure 2:
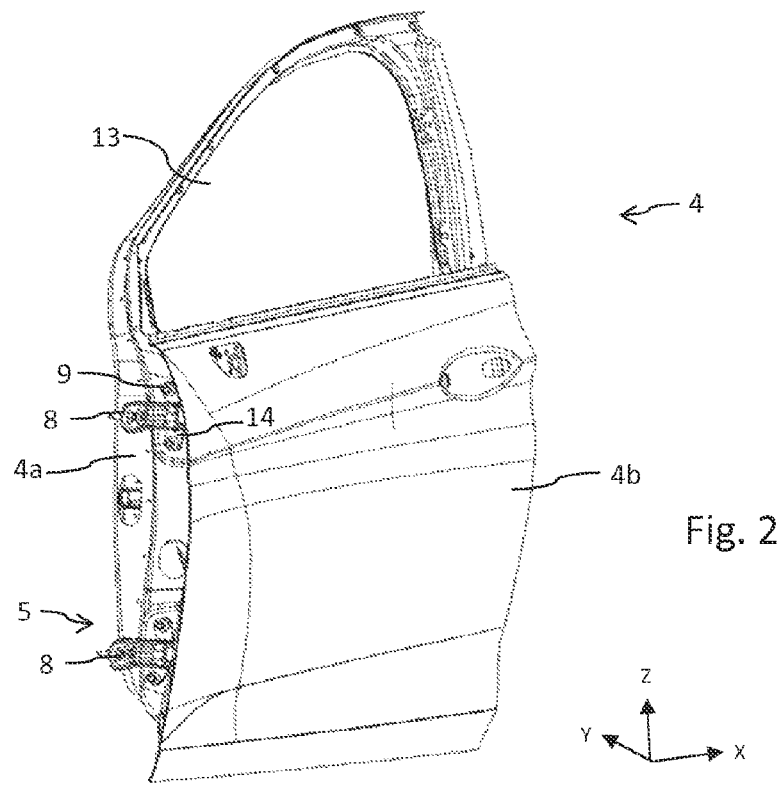
FIG. 2 is a perspective view of a motor vehicle door diagonally from the front.
Figure 3:
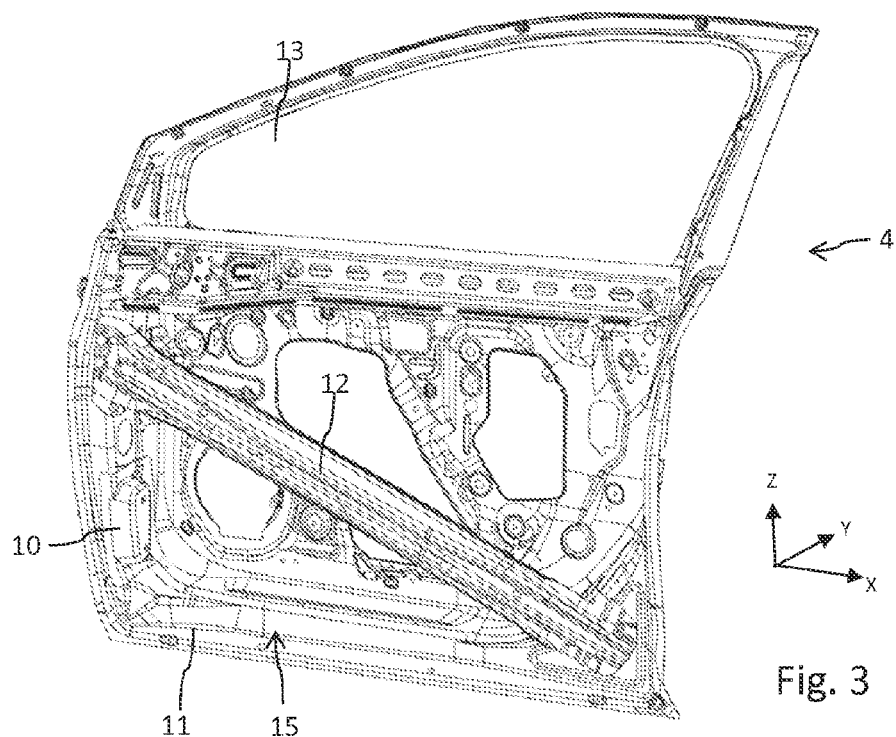
FIG. 3 is a side view of the motor vehicle door from outside, with the outer panel removed.
Figure 7:
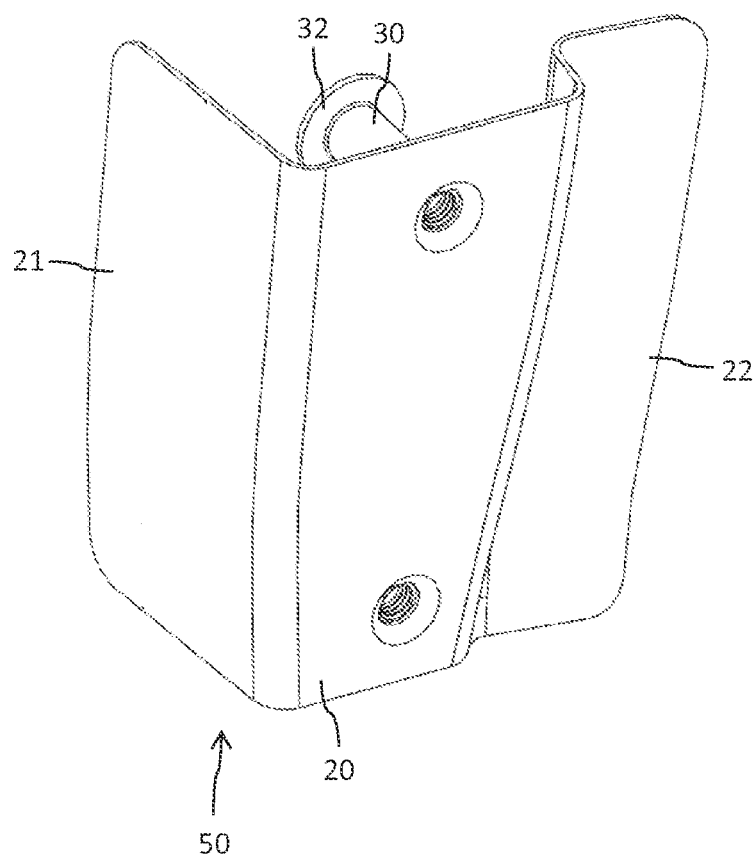
FIG. 7 is an embodiment of a hinge reinforcement.

FIG. 2 shows the hinge wings 8 that belong to the door hinge 5 and are arranged on the motor vehicle door side, which are each bolted by means of two threaded fasteners 9 with the door structure that is shown on FIG. 3 and acts as the support structure for the motor vehicle door 4. In order to provide a thrust bearing and attach the hinge wing 8 to the door structure 11 in a stable, durable and torsion-free manner, a hinge reinforcement 10, 50 shown in perspective and in isolation on FIGS. 5 and 7 is furnished for each hinge wing 8 on the door structure 11.

Figure 4:
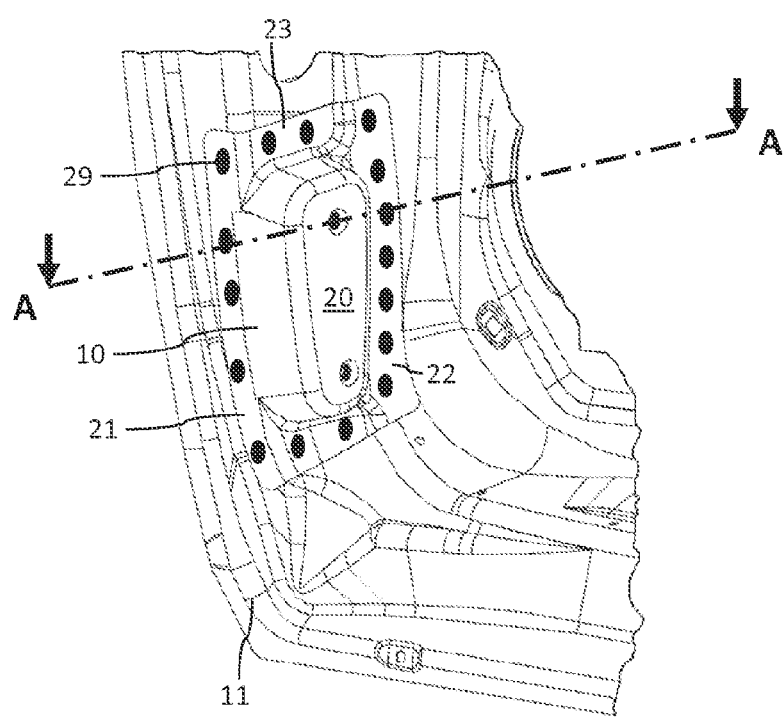
FIG. 4 is a detail showing a cutout from FIG. 3.

As shown on FIG. 3, the door structure 11 depicted on FIG. 3 is further provided with a diagonal reinforcement 12, which acts as a side impact brace. Above a waistline that is not explicitly shown, the motor vehicle door 4 includes a window recess 13. The hinges are attached or the hinge wings 8 are fastened to the door structure 11, and hence to the motor vehicle door 4, by way of a front face side 4a of the door. FIGS. 3 and 4 show the motor vehicle door according to FIG. 2, respectively with an outer panel 4b that has been removed and acts as the outer skin.

Figure 6:
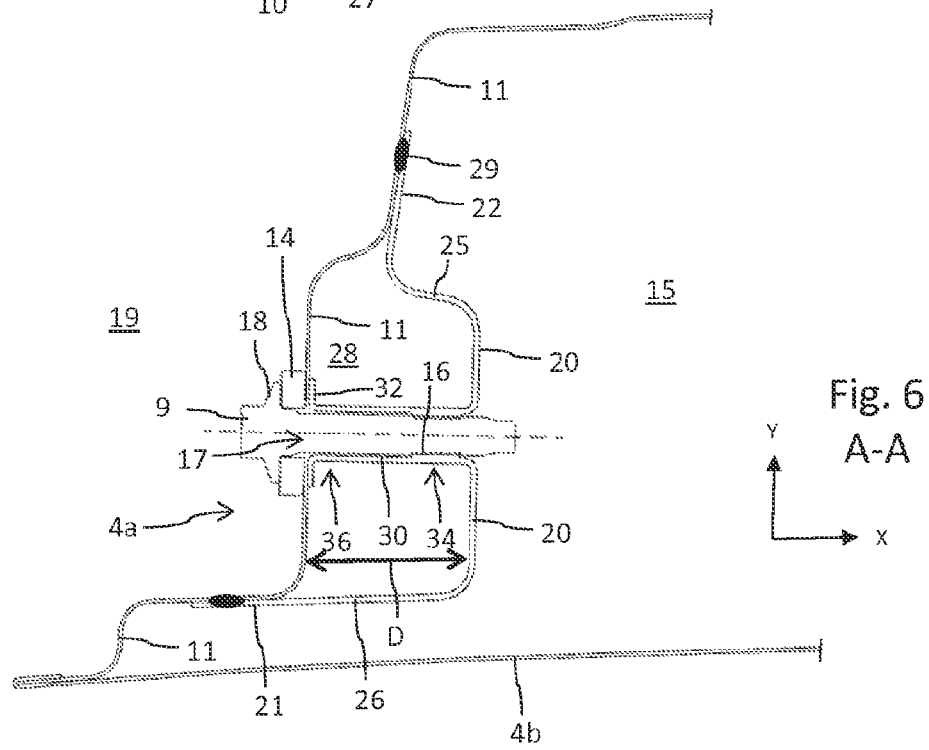
FIG. 6 is a cross section through the arrangement taken through line A-A shown in FIG. 4.

The hinge reinforcement 10 is situated on the inside, i.e., on an interior side 15 of the door structure, with the interior side, as evident from FIG. 6, being bordered from outside by the outer panel 4b, and with the interior side 15 lying against one of sides of the door structure 11 facing away from the front face side 4a.

Figure 5:
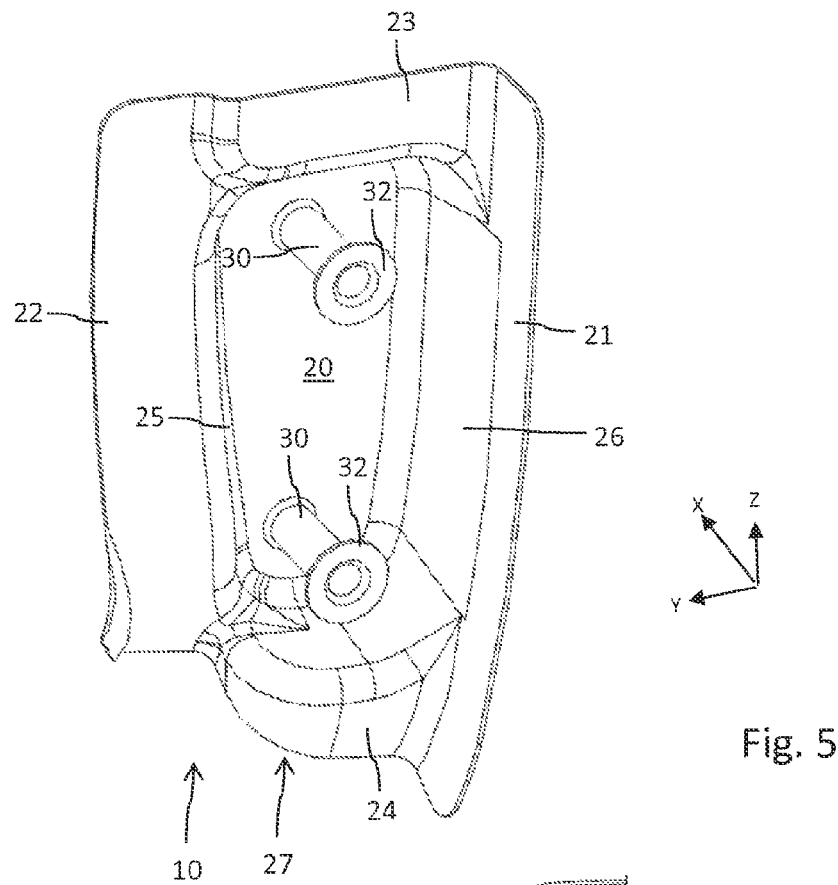
FIG. 5 is an isolated and perspective view of the hinge reinforcement.

The hinge reinforcement 10 shown on FIGS. 5 and 6 in isolation and in an installation position includes a largely flat force absorption area 20, which lies between at least two opposing mounting flange sections 21, 22. The mounting flange section 21 is here designed as an elongation of a cheek 26, which extends at roughly a right angle to the force absorption area 20.

Provided opposite the edge-side mounting flange section 21 is another mounting flange section 22, which also passes over into the force absorption area 20 by way of a cheek 25. The cheeks 25, 26 are aligned roughly parallel to each other. In the present case, the mounting flange sections 21, 22 provided at the free ends of the cheeks 25, 26 and in this respect facing away from the force absorption area 20 are aligned roughly perpendicular to each other, so as to provide an attachment structure that corresponds to the door structure 11 or is congruent therewith.

Apart from the left and right mounting flange sections 21, 22, the hinge reinforcement 10 shown on FIG. 5 also includes upper and lower mounting flange sections 23, 24, which are correspondingly also provided on opposing edges of the force absorption area 20. The mounting flange sections 21, 22, 23, 24 shown in perspective on FIG. 5 merge seamlessly into each other, and in this respect form a circumferential flange structure 27 that is supported to largely a complete extent on the door structure 11, and typically is permanently bonded with the door structure 11 by means of welded joints 29.

In the final assembly configuration shown on FIG. 6, the force absorption area 20 comes to lie spaced apart from the door structure 11, and forms a hollow space 28 with the door structure 11. The force absorption area 20 further includes two bushings 30 spaced apart from each other in the vertical direction of the vehicle (z) in the assembly configuration, whose free ends facing away from the force absorption area 20 each exhibit a radially expanded collar 32.

The bushings 30 are supported by means of their collar 32 against an opening boundary of a passage opening 17 of the door structure 11. The hollow bushing 30 includes a female thread section 34, which is spaced further part from the collar 32 and the free end of the bushing 30, and borders a non-threaded section 36 that extends up to the free end of the bushing 30 or up to the collar 32 of the bushing. In particular, the female thread section 34 borders up to the force absorption area 20.

It interacts in particular with a thread section 16 of a threaded fastener 9 that can be passed from the face side 4a and from an exterior side 19 through the passage opening 17 of the door structure 11 and introduced into the bushing 30 aligned flush thereto. Further situated between a head 18 and the section of the door structure 11 comprising the face side 4a is a pressure distribution plate 14, which serves as a thrust bearing for the head 18, and in this respect acts as a structurally reinforcing washer.

The axial length of the female thread section 34 and its axial position relative to the overall length of the bushing 30 are selected in such a way that the forces and torques are introduced into the door structure 11 over a comparatively large surface, and hence in a homogeneous and especially rigid manner in terms of torque when tightening the threaded fastener 9 and establishing a threaded connection between the threaded fastener 9 and bushing 30, in particular by way of the edge-side mounting flange sections 21, 22, 23, 24.

The distance D between the force absorption area 20 and the door structure 11 measures between 20 mm and 40 mm, preferably between 25 mm and 30 mm. The distance D here corresponds with the axial length of the bushing 30.

In particular, the bushing 30 is designed as a single piece with the hinge reinforcement 10, especially with its force absorption area 20. The hinge reinforcement 10 can here be designed in particular as a sheet metal part, in particular comprised of sheet steel. However, it can also consist of a light metal, for example comprised of aluminum or magnesium, or at least regionally exhibit a light metal.

Forming and cutting a female thread section 34 into the bushing 30 designed as a single piece with the force absorption area 20 makes it possible to eliminate the weld nuts otherwise customary for hinge attachment. The manufacturing and production complexity for a hinge can in this respect be advantageously diminished.

FIG. 7 shows an alternative embodiment of a hinge reinforcement 50, which in place of a circumferential flange structure 27 only includes a left mounting flange section 21 and an opposing right mounting flange section 22, which in comparison to the embodiment of the hinge reinforcement 10 shown on FIG. 5 are largely identical or similar in design. In comparison to the hinge reinforcement 10 shown on FIG. 5, such a hinge reinforcement 50 includes a lower weight given the absent upper and lower mounting flange sections 23, 24.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A motor vehicle door configured for hingedly mounting to the body of a motor vehicle comprising:
a door structure having a hinge reinforcement arranged on an interior side of the door structure, the hinge reinforcement including a respective mounting flange section abutting the door structure on at least two opposing outer edges and a force absorption area between the at least two opposing mounting flange sections, the force absorption area situated at a distance from the door structure to define a hollow space there between and the force absorption area is recessed relative to the door structure to form the hollow space, wherein the hinge reinforcement comprises at least two bushings in the force absorption area that are spaced apart from each other and aligned parallel to each other, and the at least two bushings outwardly extend from the hollow space of the force absorption area.

2. The motor vehicle door according to claim 1, wherein the hinge reinforcement further comprises a circumferential flange structure that forms an outer edge.

3. The motor vehicle door according to claim 1, wherein the hinge reinforcement comprises a cup-shaped element, and wherein the force absorption area forms a floor of the cup-shaped element.

4. A motor vehicle body comprising at least one pillar and at least one motor vehicle door according to claim 1 hingedly mounted thereto by at least one door hinge.

5. A motor vehicle comprising a motor vehicle body and at least one motor vehicle door hingedly according to claim 1 mounted thereto by at least one door hinge.

6. The motor vehicle door according to claim 1, wherein the force absorption area is supported against the door structure by at least one bushing.

7. The motor vehicle door according to claim 6, wherein the bushing penetrates through the hollow space, and is aligned flush with a passage opening formed in the door structure.

8. The motor vehicle door according to claim 6, wherein the bushing is joined as a single piece with the force absorption area.

9. The motor vehicle door according to claim 6, wherein the bushing is molded to the force absorption area.

10. The motor vehicle door according to claim 6, wherein an end section of the bushing that faces the force absorption area comprises a female thread section.

11. The motor vehicle door according to claim 6, wherein the bushing is between 20 mm and 40 mm in length.

12. The motor vehicle door according to claim 6, further comprising a door hinge wing of a door hinge joined with the door structure via the hinge reinforcement with a threaded fastener that engages the bushing, wherein a head of the threaded fastener abuts against an exterior side of the motor vehicle door facing away from the door reinforcement.

13. The motor vehicle door according to claim 6, wherein an end section of the bushing that faces the door structure comprises a non-threaded section.

14. The motor vehicle door according to claim 13, wherein the non-threaded section comprises between 50% and 85% of the overall length of the bushing.

15. A motor vehicle door configured for hingedly mounting to the body of a motor vehicle comprising:
a door structure having a hinge reinforcement arranged on an interior side of the door structure, the hinge reinforcement including a respective mounting flange section abutting the door structure on at least two opposing outer edges and a force absorption area between the at least two opposing mounting flange sections and situated at a distance from the door structure to define a hollow space there between, the force absorption area supported against the door structure by at least one bushing,
wherein the end section of the bushing facing the door structure comprises a radially expanded collar.

* * * * *